United States Patent

Lipp et al.

[15] 3,671,935

[45] June 20, 1972

[54] METHOD AND APPARATUS FOR DETECTING BINARY DATA BY POLARITY COMPARISON

[72] Inventors: James P. Lipp; William H. Jones, both of Oklahoma City, Okla.

[73] Assignee: Honeywell Information Systems Inc.

[22] Filed: May 28, 1970

[21] Appl. No.: 41,493

[52] U.S. Cl. ..................340/146.1 AB, 325/41, 340/174.1 B

[51] Int. Cl. ..........................................................G08c 25/00

[58] Field of Search ................340/146.1, 174.1; 178/67, 68, 178/88; 325/41, 42, 38, 45; 329/110

[56] References Cited

UNITED STATES PATENTS

| | | | |
|---|---|---|---|
| 3,417,333 | 12/1968 | Atzenbeck | 340/146.1 X |
| 3,335,224 | 8/1967 | Meslener et al. | 340/146.1 X |
| 3,244,986 | 4/1966 | Rumble | 178/88 |
| 3,331,051 | 7/1967 | Simon | 340/146.1 X |
| 3,461,426 | 8/1969 | Lender | 340/146.1 |
| 3,349,328 | 10/1967 | Hunkins et al. | 325/38 |
| 3,467,777 | 9/1969 | Rumble | 325/38 X |
| 3,529,290 | 9/1970 | Schroeder et al. | 340/146.1 |

*Primary Examiner*—Charles E. Atkinson
*Attorney*—Edward W. Hughes and Fred Jacob

[57] ABSTRACT

An apparatus and a method is disclosed in which binary data is retrieved from a medium on which data is stored. A read signal representative of the binary data is derived, differentiated, and sampled to obtain two sample signals representative of the polarity of the differentiated read signal. The two sample signals are compared to obtain the binary value of the data.

2 Claims, 5 Drawing Figures

INVENTOR.
WILLIAM H. JONES
JAMES P. LIPP

METHOD AND APPARATUS FOR DETECTING BINARY DATA BY POLARITY COMPARISON

BACKGROUND OF THE INVENTION

This invention relates to a data storage and retrieval system and more particularly to methods and apparatus for detection of binary digits (bits) from a medium storing signals representing the binary information stored according to double frequency and phase modulation codes.

1. Field of the Invention

The invention may be utilized in high speed information processing systems where the information processed is supplied from any one of many types of external sources: such as, magnetic and thermo-plastic recording tapes, magnetic discs, magnetic drums, magnetic arrays of thin-film sites, punched tape, punched cards, document bearing magnetic ink imprints, optically recognizable coded imprints, machine or hand recorded marks, or other information source readily converted into electrical information signals.

In any data retrieval system the primary object is to accurately retrieve the desired information. In modern information processing systems, where information is exchanged between external storage devices and the system processor, precise and reliable information retrieval has become critical. The necessity for extracting a relatively high quantity of digital data from a relatively small portion of a storage medium in a manner whereby the stored data may be accurately retrieved from electrical signals which have frequently been distorted by adjacently stored information in close proximity, has further inhibited the development of reliable data retrieval systems.

2. Description of the Prior Art transitions.

It is well known in the art that digital information can be stored in a storage medium having a magnetic surface and that information thus stored may be retrieved by providing relative movement between the medium and an electro-magnetic transducer. The transducer is capable of sensing or detecting patterns of magnetic polarity changes or transitions between discrete areas on the surface of the storage medium and generating an alternating electrical read signal having alternating polarity corresponding to the patterns of magnetic polarity transitions. This detected pattern of magnetic polarity transitions, or "flux" reversals as they are commonly referred to when interpreted in conjunction with an additional parameter (such as time or position), are indicative of the information stored in a plurality of discrete magnetized areas (termed "-cells") on the surface of the storage medium. The pattern of magnetic polarity transitions thus detected is commonly referred to as a "code".

One prior art system for storing information on magnetic tape, drums, and discs, is based upon a code which is known as a "double frequency" code. In a magnetic storage system using a double frequency code, each binary bit cell experiences a change in polarity at the boundary of a bit cell. The double frequency code involves the use of two frequencies, a unit frequency providing one complete cycle of flux change within a bit cell and a double unit frequency providing one half cycle of flux change within a bit cell. Accordingly, the binary "1" may be represented by a change in magnetization from a negative magnetization to a positive magnetization or vice versa at the center of the bit cell and the binary "0" would be represented by the absence of a change in magnetization at the center of a cell.

Another prior art system for storing information on magnetic tape, drums, and discs, is based upon a code which is known as "phase modulation". In a magnetic storage system using phase modulation each binary bit cell experiences a change in polarity at the center of a bit cell. The direction or "sense" of a polarity change represents the binary information. For example, a binary "1" may be represented by a change from the positive magnetization to a negative magnetization at the center of the bit cell, and binary "0" would be represented by a change in magnetization from a negative magnetization to a positive magnetization. Additional magnetization changes may or may not occur at cell boundaries as necessary to assure compliance with the sense of polarity change (phase) at the center of each bit cell as established in the above described example.

Accordingly, in the above described prior art systems, when a binary digit is read from a cell containing a polarity transition, a critical portion on a read signal is examined at a fixed width and precise time interval or "sampling window" at the center of each cell to determine the presence or absence of a polarity transition. Furthermore, in the case of the prior art phase modulation system it is necessary to not only determine the presence of a magnetic flux transition but also the direction or sense of magnetic polarity. A crucial problem has existed because of the alternating electrical read back signal being detected as having a peak or a derivative zero-crossover or node at the center of each cell corresponding to a polarity transition within a fixed sampling window. This results in errors occurring for high density data detection where, due to pulse crowding effects known as peak shifting and amplitude deterioration, the peak or its derivative zero-crossover has shifted out of the sampling window or the amplitude may be insufficient to allow detecting the presence of a flux transition.

Also, at very high densities, mechanical tolerances are critical so that slight variations in speed of the record medium can cause rapid time displacement of the read signal such that sensing at a precise time interval within a sampling window may produce an erroneous detected digit.

SUMMARY OF THE INVENTION

In accord with the present invention, a data retrieval system which retrieves data information recorded on a medium and a method for retrieving the data information are provided. The polarity of the signal read from the medium is used to detect the binary digit value and the occurrence of an error.

The information, represented by transitions within each of a succession of cells, is sensed or detected and a differentiated alternating electrical read signal is generated. First and second electrical sample signals representing the polarity sense of the differentiated alternating electrical read signal are generated and compared to each other. As a result of the comparison, output signals are provided which indicate whether a change in polarity has occurred. One of the output signals is data information represented by the sense of polarities of each successive pair of first and second electrical sample signals. A second one of the output signals indicates an error or a lack of an error.

In more specific forms the invention is concerned with the detection of digits for double frequency and phase modulation coded information. A comparison means provides for detecting a first and second digit in a double frequency code by the detection of a like or an unlike sense of polarity for the first and second electrical sample signals. An error is detected by comparing a second electrical sample signal for a corresponding cell with a first electrical sample signal for an immediately preceding cell. The comparison means provides for detecting a first and second binary digit in a phase modulation code upon comparison of first and second sample signals representing first and second opposite senses of polarity. An error is detected upon comparison of first and second sample signals representing no change in sense of polarity.

Accordingly, the present invention utilizes polarity comparison to read binary information from each cell and also to detect errors in the differentiated alternating electrical read signal with a common comparison means. Because the binary digit is read by comparison of two sample signal polarity representations based upon the detecting or sampling of the differentiated alternating electrical read signal, at any point corresponding to a position within a full first or second half of a cell, the width of a sample window is thereby extended to be over an entire one half cell. This reduces decision errors resulting from use of a narrow fixed width sampling window as experienced in the prior art for peak shifting effects due to pulse crowding. Furthermore, since the comparison depends strictly upon detection of the sense of polarity rather than the amplitude of the read signal, a deterioration of amplitude as resulting in the prior art is less likely to result in an error due to low signal amplitude. As a result of effectively increasing the cell time interval for detecting the differentiated alternating electrical read signal and polarity detection, errors due to the peak shifting effects and amplitude deterioration resulting in the prior art are reduced.

The present invention utilizes a single comparison network to provide for both data detection and error detection. The present invention is also readily adaptable for the retrieval of binary digits represented in either the double frequency or phase modulation codes.

It is, therefore, an object of this invention to provide both an improved method and an improved apparatus for the retrieval of stored binary information capable of higher density operation and greater reliability.

A further object of the present invention resides in the provision of an improved detection system for retrieving binary data represented in a phase modulation code.

A still further object of the present invention resides in the provision of an improved detection system for retrieving binary data represented in a double frequency code.

Another object of this invention is the provision of a binary data detection system utilizing common hardware for both data retrieval and error detection.

Still another object of this invention is to provide a more accurate method and a more reliable apparatus for the retrieval of binary data by increasing the effective sampling window of a cell for detecting the presence or absence of transitions representing binary digits.

The invention is particularly pointed out with particularity in the appended claims. However, other objects and advantages, together with the operation of the invention, may be better understood by reference to the accompanying detailed description of operation.

BRIEF DESCRIPTION OF THE DRAWING

The present invention may be more readily described by reference to the accompanying drawing in which.

DESCRIPTION OF THE PREFERRED EMBODIMENTS

Figure 1:
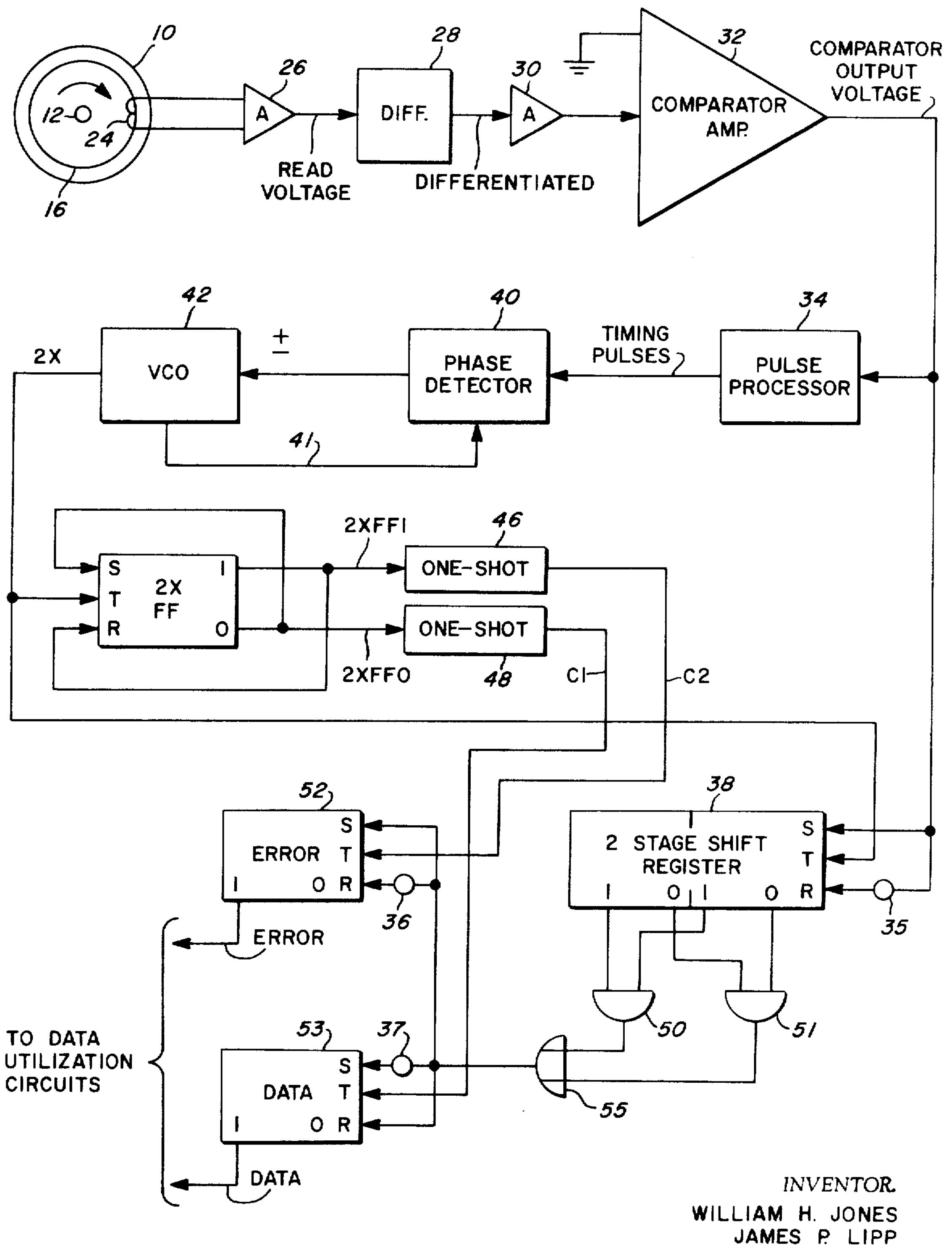
FIG. 1 illustrates a binary data retrieval circuit for use with the present invention.
Figure 2:
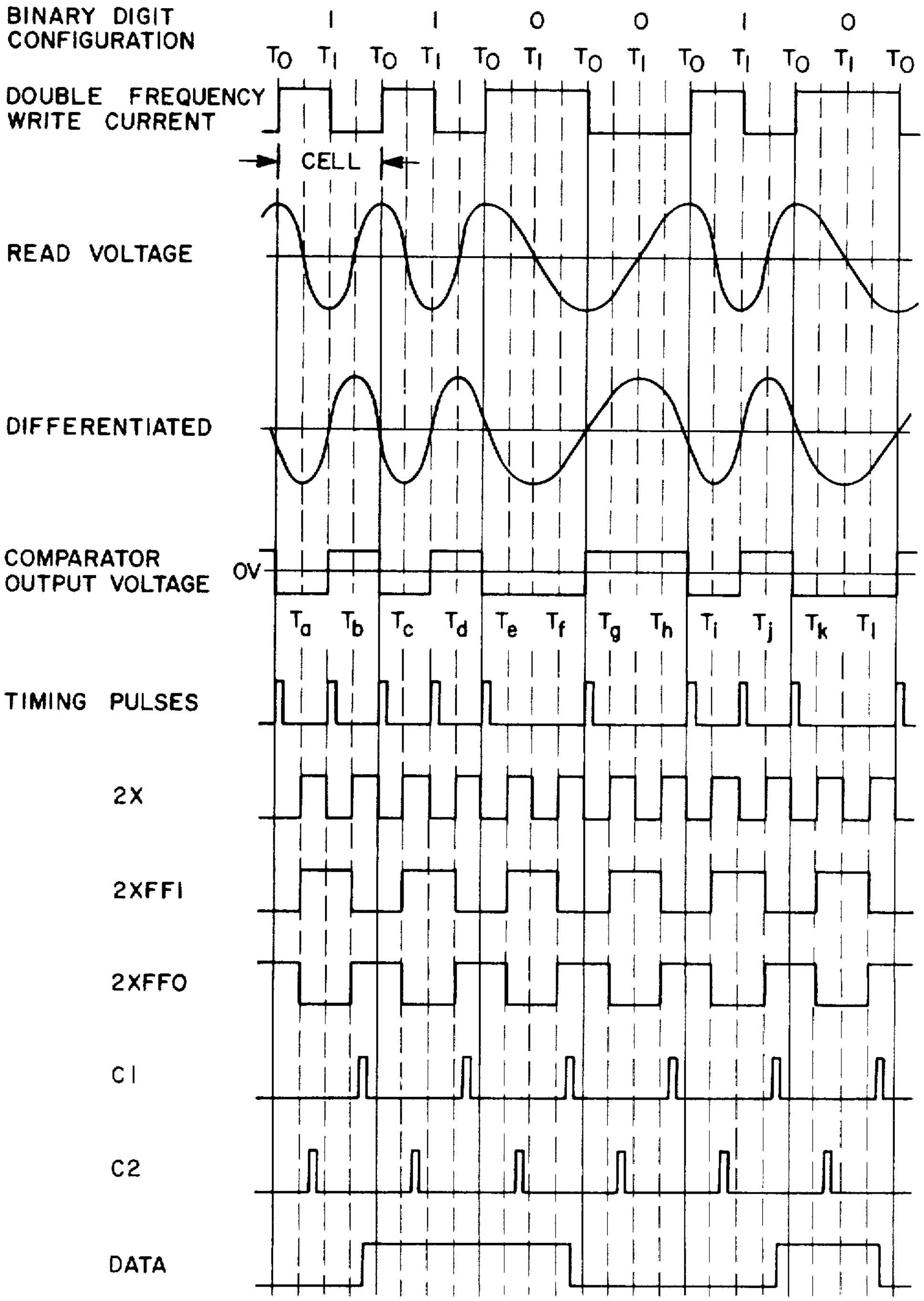
FIG. 2 illustrates recording, retrieval, and timing signal waveforms which occur in a first embodiment of the invention.

For a more complete understanding of the invention, reference is made to the logic schematic of FIG. 1 and the accompanying timing diagrams illustrated in FIG. 2 by waveforms designated as DOUBLE FREQUENCY WRITE CURRENT, READ VOLTAGE, DIFFERENTIATED, COMPARATOR OUTPUT VOLTAGE, TIMING PULSES, 2X, 2XFF1, 2XFF0, C1, C2, and DATA.

The signals to be described will be referred to as a high or enabling signal and a low or disabling signal. The logic illustrated is of conventional nature. That is, an AND-gate is a multiple input logic element which provides at its output a high or enabling signal when each of its input signals are enabling signals. An OR-gate is a multiple input logic element which provides a high or enabling output signal when one or more of its input signals is a high or enabling signal. The term flip-flop, as used in the present description, designates a bistable multivibrator with its two stable states being a set state in which there is a binary "1" digit or a high or enabling signal at its "1" output terminal and a reset state in which there is a binary "0" or low or disabling signal at its "1" output terminal.

The type of flip-flop utilized in the present description has three input terminals, an S (Set) terminal, a T (Trigger) terminal, and an R (Reset) terminal. This type of flip-flop is designated as a triggered flip-flop. In this device a high or enabling signal applied to the S terminal simultaneously with a high or enabling signal at the T terminal will place the triggered flip-flop into its set state and a high or enabling signal applied to the R terminal simultaneously with the application of a high or enabling signal at the T terminal will place the triggered flip-flop in its reset state. A type of one-shot utilized in the present description is a two-state circuit which is normally in a stable reset state. A suitable input signal triggers the one-shot to its astable set state which state it maintains for a predetermined design period after which it automatically returns to its reset state. An example of such a one-shot circuit is shown by Abraham I. Pressman in FIG. 11–15 of *Design of Transistorized Circuits for Digital Computers*, John F. Rider, Publisher, Inc., New York, 1959.

Timing

Referring now to FIGS. 1 and 2, in FIG. 1 a storage medium 10 in the form of a disc having a magnetizable coating is mounted for rotation in a clockwise direction about an axis 12 by a suitable drive means, not shown. An information track 16 arranged on storage medium 10 is provided for storing intelligence in the form of discrete magnetically polarized areas in a succession of data cells represented in FIG. 2 as cells in the WRITE CURRENT signal having boundaries and midpoints corresponding to times $T_0$ and $T_1$ respectively. A suitable transducer 24 is arranged adjacent to track 16 and serves to generate electrical signals in response to relative motion between disc 10 and transducer 24 in response to the changing polarity of discrete areas on the track. The output signals thus generated are amplified by an amplifier 26 to derive the READ VOLTAGE signal illustrated in FIG. 2 in a manner to be described hereinafter, which is applied to a differentiator 28. Differentiator 28 produces a DIFFERENTIATED signal which is then applied to a second amplifier 30. The output of the second amplifier 30 is then applied to an input of a comparator amplifier 32. The output of the Comparator Amplifier 32 is applied to a pulse processor 34 and a two stage shift register 38.

One suitable comparator amplifier circuit is described and shown, for example, in *Pulse, Digital and Switching Waveforms* by J. Millman and H. Taub, McGraw-Hill Book Company, 1965, in FIG. 7–26, p. 257. Comparator amplifier 32 operates such that whenever the level of the signal from amplifier 30 is at a lower level than the 0-volt reference, the output of comparator amplifier 32 will be at a low or disabling level. When the output of amplifier 30 applied to the input of comparator amplifier 32 exceeds the 0-volt threshold level the output of comparator amplifier 32 will be at a high or enabling level. Accordingly, the output of comparator amplifier 32 provides a signal on the comparator output voltage line having a COMPARATOR OUTPUT VOLTAGE waveform as illustrated in FIG. 2.

Pulse processor 34 performs a series of cascaded operations. The operations are proper filtering, amplifying, clipping, differentiating and rectifying in a manner such that the pulses labeled TIMING PULSES (FIG. 2) are obtained from the COMPARATOR OUTPUT VOLTAGE waveform. Pulse processor 34 thus produces a series of positive polarity pulses which are applied to a phase detector 40.

The output of phase detector 40 is an error sense voltage which is transmitted to a voltage controlled oscillator 42 whose output signals are as illustrated by the 2X waveform of FIG. 2. The square wave signals 2X have a frequency, in the embodiment disclosed, of two times the repetition rate of the data cell occurring in the information track 16. The output signals of the voltage controlled oscillator 42 are transmitted via a feedback loop 41 to the phase detector 40.

Phase detector 40 compares the phase of its input signal from pulse processor 34 with the output signal of the voltage controlled oscillator 42 to provide an output voltage signal either positive or negative, representative of the difference in phase between these two signals. This output voltage signal is supplied to the voltage controlled oscillator 42 and causes the oscillator 42 to vary its output frequencies such that the output 2X signal is in close synchronism with the basic frequency of the signals being derived from the information track of disc 10.

As used herein, the terms information and data are synonymous. The 2X signal from oscillator 42 is transmitted to a T terminal input of a 2X FF flip-flop and to a T input terminal of a first stage of two stage shift register 38. The 2X signal applied to the T input of the 2X FF flip-flop logic provides for controlling the setting and resetting of the 2X FF flip-flop for generating 2XFF1 and 2XFF0 output signals from the 1 and 0 output terminals respectively, as illustrated by the 2XFF1 and 2XFF0 waveforms of FIG. 2.

The 2XFF1 output signal is applied to a monostable multivibrator or one-shot 46 to provide a C2 output pulse illustrated by the C2 waveform in FIG. 2, while the 2XFF0 output signal is applied to a one-shot 48 which responds to provide a C1 output pulse as illustrated by the C1 waveform in FIG. 2. The C1 and C2 output pulses are provided to a T input terminal of a DATA flip-flop 53 and an ERROR flip-flop 52 respectively.

Referring to FIG. 2, the C1 and C2 waveforms illustrate that the C2 pulse is provided during a first half of each cell time and the C1 pulse is provided during a second half of each cell time. The C2 and C1 pulses may be provided, by way of example, during a second quarter and fourth quarter of each cell time. Similarly, the 2X waveform (FIG. 2) illustrates a pulse as appearing in the first half and in the second half of each cell. The 2X waveforms may, by way of example, provide pulses appearing at a one-fourth point and three-fourth point of each cell. Accordingly, the 2X signal provides for signal pulses which will be used for sampling the COMPARATOR OUTPUT VOLTAGE signal at a time within the first half of a cell and at a time within the second half of a cell in a manner to be described hereinafter.

Read logic for retrieving information recorded in the double frequency code is illustrated in FIG. 1 as comprising a two stage shift register 38, inverters 35–37, AND-gates 50 and 51, flip-flops 52 and 53 and an OR-gate 55.

The COMPARATOR OUTPUT VOLTAGE waveform will alternate between the high or enabling and the low or disabling levels to represent the positive and negative polarity of magnetization in each of the six cells illustrated in FIG. 2. The output signal from comparator amplifier 32 is applied directly to an S input terminal and through inverter 35 to an R input terminal of a two stage shift register 38 as illustrated in FIG. 1. The output from voltage controlled oscillator 42 on the 2X line is applied directly to the T input terminal of the first stage of the two stage shift register 38. The 2X signal at the T input terminal in conjunction with the COMPARATOR OUTPUT VOLTAGE signal as applied directly to the S input terminal and as applied through inverter 35 to the R input terminals provide a detection means or sampling means at the input of the two stage shift register 38. The S and T terminals and T and R terminals function as sampling gates to detect or sample the COMPARATOR OUTPUT VOLTAGE signal at times corresponding to positions within a first and a second half of each cell to provide a set of sample signals internally to the shift register indicative of the polarity represented by the COMPARATOR OUTPUT VOLTAGE.

The set of sample signals representing the polarity at a time corresponding to a position within a first and a second half of a cell are then utilized by the shift register for entering a first and a second sample signal sequentially into a first stage of the shift register.

Operation — Double Frequency Code

FIG. 2 illustrates by means of the DOUBLE FREQUENCY WRITE CURRENT waveform the flux reversal positions or patterns of representations which would be written onto a magnetic recording surface in double frequency code for a six binary digit configuration of 110010, as read from left to right. These six bits are stored in six respective cells. For example, a binary "1" is recorded as a flux reversal at both the $T_0$ and $T_1$ time positions of the first cell, and a binary "0" is recorded as a flux reversal only at the $T_0$ position of a third cell. The DOUBLE FREQUENCY WRITE CURRENT waveform represents an idealized signal current waveform which may be applied to a recording head winding of a transducer in order to store, on a suitable media, magnetization patterns representing the binary digit configuration.

FIG. 2 illustrates by means of a READ VOLTAGE waveform a resultant alternating electrical read signal voltage waveform corresponding to the flux reversal pattern illustrated by the DOUBLE FREQUENCY WRITE CURRENT waveform. This READ VOLTAGE waveform may be obtained from a transducer or sensing means sensing the flux reversal pattern. FIG. 2 by means of a DIFFERENTIATED waveform illustrates the READ VOLTAGE waveform following differentiation. What was previously illustrated as zero-crossover points and peaks of the READ VOLTAGE waveform are illustrated in the DIFFERENTIATED waveform as being peaks and zero-crossover points respectively. FIG. 2 further illustrates by means of the COMPARATOR OUTPUT VOLTAGE waveform, the DIFFERENTIATED waveform following application to comparator amplifier 32 to provide a square wave representation of the DIFFERENTIATED waveform. Thus, with reference to FIG. 2 assuming that the binary digit configuration illustrated is to be read from 6 cells reading from left to right, at a first high or enabling 2X signal pulse and at a time identified as $T_a$ in a first cell, a low or disabling signal level appearing on the COMPARATOR OUTPUT VOLTAGE waveform would be indicative of a negative polarity. The high or enabling 2X signal at the T input terminal in conjunction with a high or enabling signal applied through inverter 35 to the R input terminal will result in a sample signal indicative of a negative polarity to place the first stage of the shift register into a reset or binary "0" state. Thus, the first stage of the shift register being in a reset state indicates a negative polarity at a time corresponding to position $T_a$ within the first half of the first cell.

At the time of occurrence of the next high or enabling 2X signal pulse at the T input terminal, as illustrated in FIG. 2 as being at a time $T_b$, in conjunction with a high or enabling comparator output voltage signal at the S input terminal, the first stage of the shift register will be placed in a set or binary "1" state and the binary "0" state of the first stage is simultaneously shifted into the second stage. Therefore, following the initial two high or enabling 2X signal pulses at times $T_a$ and $T_b$ of the first cell the two state shift register will contain a 01 bit configuration indicating the detection of a negative polarity within a first half of the first cell and detection of a positive polarity within a second half of the first cell.

Two stage shift register 38 in conjunction with an AND-gate 50 and an AND-gate 51 provide what may be referred to as a comparator which compares the polarity indications which have been stored in the two stage shift register or storage means to determine the binary digit which has been read from a cell. The indications stored are now compared by AND-gates 50 and 51 to determine whether a binary "1" digit value or a binary "0" digit value has been read from the cell.

With a binary "1" stored in the first stage of the shift register, a low or disabling signal is provided from its "0" output terminal to one input of AND-gate 51 to disable AND-gate 51. Since the second stage of the two stage shift register 38 contains a binary "0" a low or disabling signal is provided from its "1" output to one input of AND-gate 50 to disable AND-gate 50. With AND-gates 50 and 51 disabled, OR-gate 55 is disabled to provide a low or disabling output signal which is inverted by inverter 37 and applied as a high or enabling signal to the input terminal of DATA flip-flop 53. At a suitable delay time following the presence of a high or enabling signal at the S input terminal a high or enabling C1 signal is present at the T input terminal at a time indicated by waveshape C1 of FIG. 2.

DATA flip-flop 53 is placed in a set state at the occurrence of a high or enabling C1 signal to provide a high or enabling output signal at its 1 output terminal and appearing on the DATA line as illustrated by the DATA waveform of FIG. 2. The high or enabling DATA signal is indicative to data utilization circuits, which may be by way of example located within a data processing system, that a binary one digit has been read from the first cell. Similarly, for the second cell at the $T_c$ and $T_d$ times indicated in FIG. 2 a "01" configuration is entered into the two stage shift register and a binary "1" signal is detected as having been read from the second cell at the occurrence of a high or enabling C1 signal pulse.

The third cell contains a binary zero such that with the occurrence of a high or enabling 2X signal, at a time indicated as $T_e$ the COMPARATOR OUTPUT VOLTAGE provides a low or disabling signal which is inverted through inverter 35 to provide a high or enabling signal to the R input terminal of two stage shift register 38. The first stage of the two stage shift register is thereby placed in a reset state to indicate the presence of a negative polarity at the $T_e$ cell time. At the occurrence of a next high or enabling 2X signal at a time indicated as $T_f$, the COMPARATOR OUTPUT VOLTAGE is again at a low or disabling level which results in maintaining the first stage of the shift register in a reset state. The previous reset state of the first stage is shifted to the second stage at the occurrence of the high or enabling 2X signal such that a 00 bit configuration is now stored in the two stage shift register 38.

The first and second stages of two stage shift register 38 both being in a reset state will provide high or enabling level output signals from their zero output terminals to each of two inputs of AND-gate 51, thereby enabling AND-gate 51 to provide a high or enabling signal for enabling OR-gate 55. With OR-gate 55 enabled a high or enabling signal is applied to the R input terminal of DATA flip-flop 53 which in conjunction with a high or enabling C1 signal applied to the T input terminal will be placed in a reset state as indicated by the DATA waveform of FIG. 2. The DATA signal on the DATA output signal line will then be at a low or disabling level indicating the reading of a binary "0" digit for the third cell. Similarly, a binary zero will be read for the fourth cell, a binary one as previously described, will be read for the fifth cell, and a binary zero for the sixth cell.

At a time indicated by the presence of a high or enabling C2 signal pulse as illustrated in FIG. 2 in the C2 waveform, a high or enabling signal is applied to the T input terminal of ERROR flip-flop 52. Since for the double frequency recording code a transition or change in polarity should always occur at a boundary time or $T_0$ time between two cells the states of the first and second stages of the two stage shift register should always be different following the first high or enabling 2X signal during a cell time. Therefore, at the time of a high or enabling C2 signal following the occurrence of the first high or enabling 2X signal, the contents of the two stage shift register 38 are again compared at comparison gates 50 and 51.

At the time of occurrence of the C2 signal pulse for the second cell illustrated in FIG. 2, a 10 bit configuration corresponding to a positive polarity for a second half of the first cell and a negative polarity for a first half of the second or immediately succeeding cell will be stored in two stage shift register 38 indicative of unlike polarity at the cell boundaries. In the case of a 10 bit configuration, the low or disabling output signal from the 0 output terminal of the first stage and a low or disabling output signal from the 1 output terminal of the second stage will disable comparison AND-gates 51 and 50 respectively. OR-gate 55 will thus be disabled and a high or enabling output signal from inverter 36 applied to the R input terminal in conjunction with a high or enabling C2 signal at the T input terminal of the ERROR flip-flop 52 will provide for placing flip-flop 52 in a reset state. A low or disabling output signal from the 1 output terminal of flip-flop 52 on the Error line will indicate a no error condition to the data utilization circuits. In a similar manner a 01 bit configuration will provide a no error indication.

When like polarity indications have been stored in the two stage shift register, one of comparison AND-gates 50 or 51 will be enabled to provide for placing the ERROR flip-flop 52 in a set state thereby providing a high or enabling signal from its 1 output terminal on the ERROR line indicating an error condition to the data utilization circuits. For example, for a 00 bit configuration, high or enabling signals from the 0 output terminals of the first and second stages will enable AND-gate 51. For an 11 bit configuration high or enabling signals from the 1 output terminals will enable AND-gate 50. With either of AND-gate 50 or 51 enabled, OR-gate 55 is enabled to provide a high or enabling signal to the S input terminal of ERROR flip-flop 52 in conjunction with the presence of a high or enabling C2 signal at the T input terminal to place flip-flop 52 in a set state. With flip-flop 52 in a set state, a high or enabling output signal from the 1 output terminal of ERROR flip-flop 52 is present on the ERROR line, indicating an error to the data utilization circuits.

Since the comparator output voltage waveform provides a signal with a high or enabling level corresponding to a positive or negative polarity of magnetization throughout either an entire first half or an entire second half of each cell a sampling window or sampling time which may be initiated by a 2X signal may occur at any time within a half cell time interval, thereby extending the sampling window to be the width of a full half cell. This eliminates the need for precise time sampling at a narrow center point of each cell as in the prior art. Also, the same comparison means comprising the two stage shift register 38 and comparison AND-gates 50, 51 and OR-gate 55 is utilized to detect the polarity indications stored in two stage shift register 38 for providing both a data indication and an error indication. Accordingly, the logic illustrated in FIG. 1 for retrieval of information recorded in the double frequency code provides for the detection of errors as well as data by utilizing common logic. This common logic is also readily adapted for the retrieval of information recorded in a phase modulation code in a manner to be described hereinafter.

Read Operation — Phase Modulation Code

Figure 3:
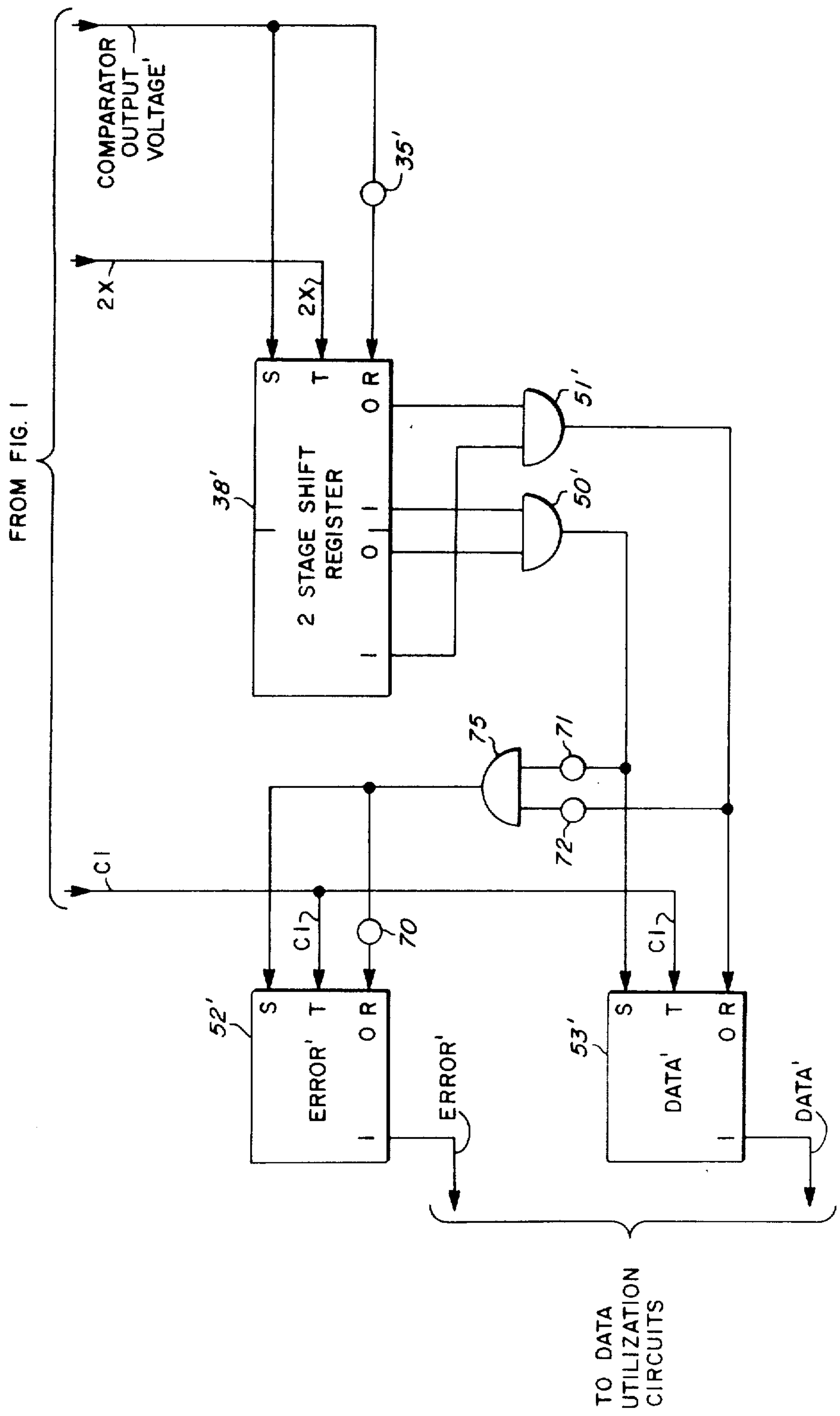
FIG. 3 illustrates a second embodiment binary data retrieval circuit for use in the present invention.
Figure 4:
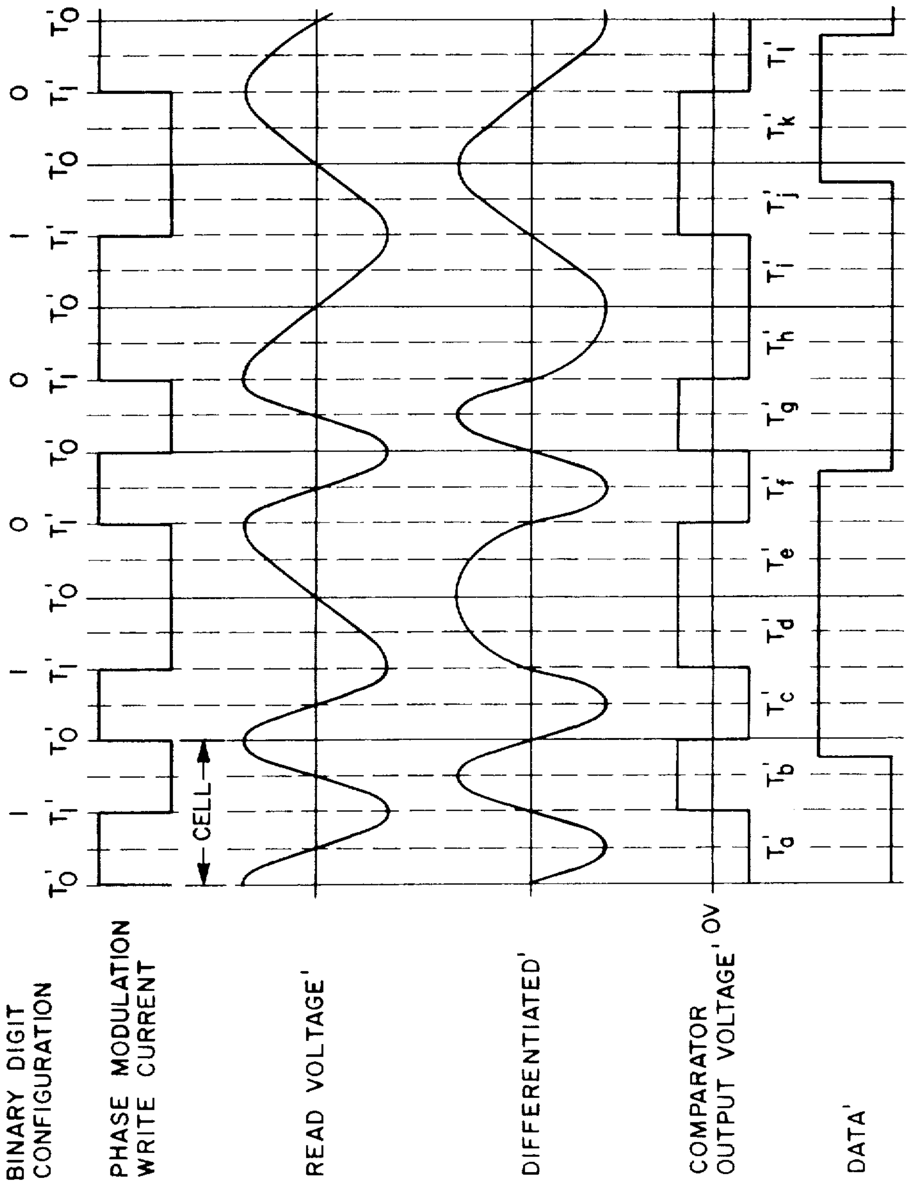
FIG. 4 illustrates recording and reproduction waveforms which occur in the second embodiment of the invention.

For a more complete understanding of the second embodiment of the invention, reference is made to the logic schematic of FIG. 3 and the accompanying timing diagrams of FIGS. 2 and 4. The timing signals utilized and the method of timing signal generation is identical to that previously described in connection with the read operation-double frequency code. Corresponding components and waveforms to those previously described and utilized in the operation-double frequency code description are given a like reference numeral with a prime affixed.

Data retrieval logic suitable for retrievable of binary information recorded utilizing a phase modulation code is illustrated in FIG. 3 as comprising a two stage shift register 38'; inverters 35', 36', 71; and 72; AND-gates 50', 51', and 75; an ERROR flip-flop 52' and a DATA flip-flop 53'. A binary digit configuration recorded in a phase modulation code suitable for retrieval by the data retrieval logic, in a manner to be described hereinafter, is illustrated in FIG. 4.

FIG. 4 illustrates by means of the PHASE MODULATION WRITE CURRENT, READ VOLTAGE', DIFFERENTIATED' and COMPARATOR OUTPUT VOLTAGE' waveforms; a recorded pattern of magnetic flux reversals recorded in a phase modulation code, a read back signal obtained by sensing the flux reversals, the read back signal differentiated and a square wave representation of the differentiated read back signal respectively for a six binary digit configuration of 110010 as read from left to right.

The COMPARATOR OUTPUT VOLTAGE' signal is applied to the S terminal of the first stage of two stage shift register 38' directly and the R terminal indirectly following inversion through an inverter 35'. The identical 2X signal waveform as employed for the logic illustrated in FIG. 1 is also applied to the T input terminal of the two stage shift register 38' to accomplish sampling of the COMPARATOR OUTPUT VOLTAGE' signal in a manner previously described with reference to FIG. 1.

With reference to a WRITE CURRENT' waveform of FIG. 4, it is seen that a flux reversal or transition occurs at each center of a cell for data recorded with the phase modulation code rather than at each boundary as previously encountered with the double frequency code. Utilizing the previously described detection techniques for the recognition of data recorded with the phase modulation recording code it is seen that for the retrieval of a binary "1" digit from a first cell illustrated in FIG. 4, a resultant 01 bit configuration will be entered into the two stage shift register 38' as a result of the sampling of the COMPARATOR OUTPUT VOLTAGE' waveform by the signals presented directly to the S and T input terminals, and indirectly to the R input terminal through inverter 35'. A high or enabling output signal from the 0 output terminal of the second stage is applied to one input of AND-gate 50' in conjunction with a high or enabling signal from the one output terminal of the first stage to a second input of AND-gate 50'. Comparison gate 50' is thereby enabled to provide a high or enabling signal to the S input terminal of the DATA' flip-flop 53'.

The occurrence of a high or enabling C1 pulse provided as illustrated in FIG. 2 and applied to the T input terminal of both the ERROR' flip-flop 52' and the DATA' flip-flop 53' provides for both detecting errors and detecting the particular binary digit being read from a cell simultaneously. Since comparison AND-gate 50' is enabled, a high or enabling input signal is present at the S input terminal of the DATA' flip-flop 53' such that with a high or enabling C1 signal the DATA' flip-flop 53' is placed in a set state to provide a high or enabling signal on the DATA' line to data utilization circuits as illustrated by the DATA' waveform of FIG. 4. The second cell containing a binary "1" digit is similarly read and the output signal on the DATA' line is maintained at a high or enabling level to indicate the presence of a binary "1" digit being read from the second cell.

In the retrieval of each binary "1" digit the comparison AND-gate 50' when enabled provides a low or disabling output signal through inverter 71 to AND-gate 75 to disable AND-gate 75. Disabled AND-gate 75 then provides a low or disabling signal to the S input terminal of the ERROR' flip-flop 52' and a high or enabling signal from inverter 36' to its R input terminal. The ERROR' flip-flop 52' is thereby maintained in a reset state to provide a low or disabling signal on the ERROR' output line indicating to the data utilization circuits that no error has been detected.

The third cell contains a binary "0" digit, therefore the COMPARATOR OUTPUT VOLTAGE' waveform of FIG. 4 will be at a high or enabling level at a $T'_e$ time for applying to the S input terminal of the first stage of the two stage shift register in conjunction with a high or enabling 2X signal provided at its T input terminal. Thus, the first stage of the two stage shift register is placed in a set state at the $T'_e$ time of a first half of the third cell. At the $T'_f$ time, the conjunctive occurrence of the low or disabling COMPARATOR OUTPUT VOLTAGE' signal which is inverted through inverter 35' to provide a high or enabling input signal to the R input terminal and a high or enabling 2X signal at the T input terminal, the first stage of the two stage shift register 38' is placed in a reset or binary "0" state. Thus, following the 2X high or enabling signal at the $T'_f$ time the content of the two stage shift register will be 10 bit configuration.

The second stage of the two stage shift register 38' being in a binary "1" state will provide a high or enabling output signal from its one output terminal to one input of AND-gate 51' in conjunction with a high or enabling input on a second input from the zero output terminal of the first stage of two stage shift register 38'. AND-gate 51' is thereby enabled to provide a high or enabling signal to the R input terminal of the DATA' flip-flop 53'. Thus, at the occurrence of a next high or enabling signal applied to the T input terminal of the DATA' flip-flop 53', flip-flop 53' is placed in a reset state indicating the reading of a binary "0" digit from the third cell. Thus, DATA' flip-flop 53' being in a reset state, will provide from its "1" output terminal a negative output signal on the DATA' line indicative of reading a binary "0" digit to the data utilization circuits.

Similarly, following sampling of the COMPARATOR OUTPUT VOLTAGE' waveform at a $T'_g$ and $T'_h$ time or position of the fourth cell the content of the two stage shift register will be a 10 bit configuration and a binary zero will be detected as having been read. A binary "1" digit will be retrieved from the fifth cell as previously described for the first and second cells and a binary "0" digit will be retrieved from the sixth cell as previously described for the third and fourth cells.

Comparison logic comprising the two stage shift register 38', comparison AND-gates 50' and 51', inverters 36', 71, and 72, AND-gate 75, and ERROR' flip-flop 52' provide for error detection. In the event that a change in polarity is not detected for any cell the two stages of the two stage shift register 38' will be in the same state representing like polarity indications stored in each stage. When the two stages are in the same state, each of AND-gates 50' and 51' will be disabled, thereby providing after inversion by inverters 71 and 72, two high or enabling signals to enable AND-gate 75. AND-gate 75 in an enabled condition provides a high or enabling output signal at the S input terminal of the ERROR' flip-flop 52' such that when the next high or enabling C1 signal is applied to the T input terminal, the ERROR' flip-flop 52' is placed in a set state. Flip-flop 52' when in a set state provides a high or enabling signal on the ERROR' line to data utilization circuits indicating that an error has been detected.

Accordingly, a set of sample signals indicative of the polarity of an alternating read signal as detected on the DIFFERENTIATED' waveform are stored as polarity indications in two stage shift register 38' as a result of sampling the COMPARATOR OUTPUT VOLTAGE' waveform. A comparison of the polarity indications is then provided by shift register 38' and comparison AND-gates 50' and 51' to detect the particular binary digit retrieved from each cell while simultaneously checking as a result of the comparison to determine if an error has occurred. As illustrated in FIG. 4 the $T'_a$ time may be varied throughout the first half of the first cell to detect the correct polarity of magnetic flux in a first half of the cell and also the $T'_f$ time or position of the first cell may be varied throughout the second half of the first cell to determine the polarity of magnetic flux in a second half of the first cell. Thus, a sampling window extending over an entire half of a cell is employed instead of being confined to a narrow sampling window time at the center of the cell as in the prior art.

Logic of the two illustrated embodiments in FIGS. 1 and 3 for retrieving information recorded in a double frequency and a phase modulation code, respectively, is seen to be readily adaptable for reading data recorded in either of the two codes. The structure of FIG. 3 contains one additional inverter and an AND-gate 75 in place of the OR-gate 55 of FIG. 1. With the rearrangement of inverters and exchange of an AND-gate with an OR-gate it is seen that the two circuits are substantially identical. Furthermore, the data retrieval circuits illustrated in FIGS. 1 and 3 utilize common logic to provide for both data detection and error detection.

Figure 5:
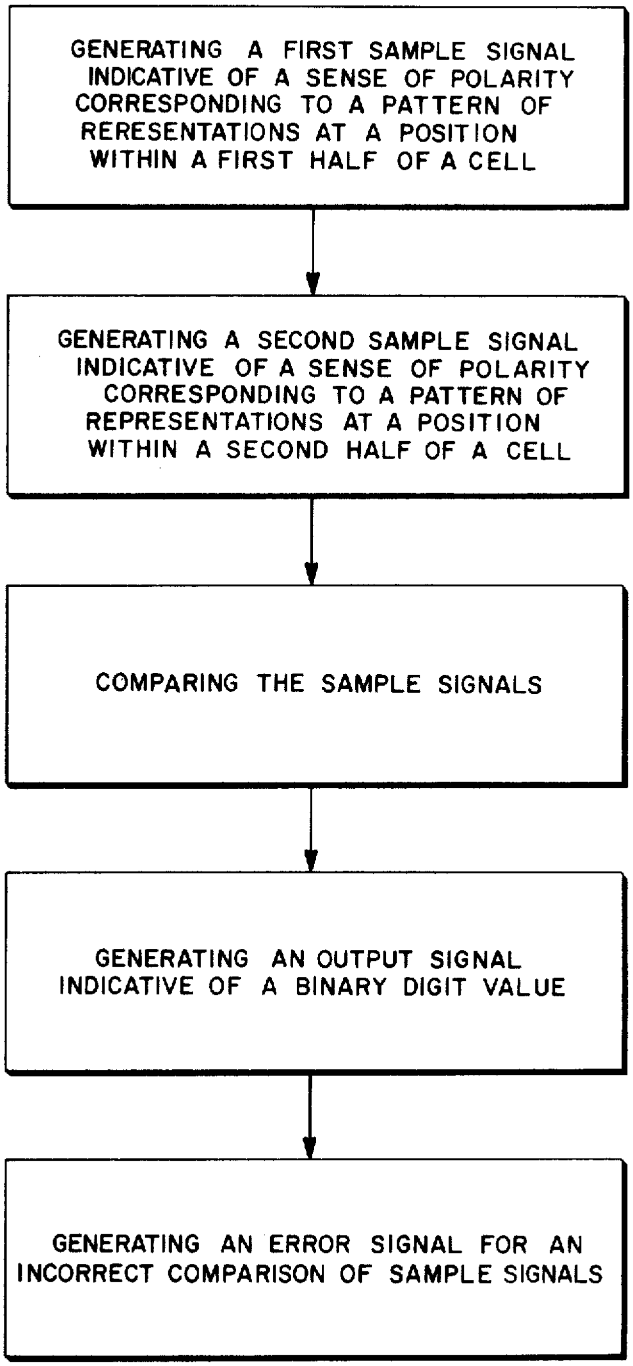
FIG. 5 is a flow diagram of steps performed in a binary data detection method according to the present invention.

Steps of a method of detecting binary digits implemented by the double frequency and phase modulation read logic previously described are illustrated in the flow diagram of FIG. 5. In the first and second steps, first and second sample signals are generated which are indicative of a sense of polarity corresponding to a pattern of representations or magnetization at positions within a first and a second half of a cell respectively. In a third step the first and second sample signals are compared and upon achieving a comparison in accordance with the code to be recognized, a fourth step is employed to generate an output signal indicative of a binary digit value. In the event that the comparison indicates an incorrect comparison of sample signals according to characteristics of the particular code, the fourth step is followed by or is accompanied by a fifth step of generating an output error signal. The method of binary data retrieval and error detection is thus achieved by polarity comparison.

While the principles of the invention have now been made clear in an illustrated embodiment, there will be immediately obvious to those skilled in the art many modifications of structure, arrangement, proportions, the elements, materials and components used in the practice of the invention and otherwise, which are particularly adapted for specific environments and operating requirements without departing from those principles. The attendant claims are, therefore, intended to cover and embrace any such modifications, within the limits only of the true spirit and scope of the invention.

We claim:

1. A magnetic reproducing system comprising:

a. sensing means for deriving an alternating electrical differentiated signal having a first and second frequency with alternating first and second polarity corresponding to the magnetization of a record medium having binary information stored within successive cells thereon, one half cycle of said first frequency corresponding to magnetization of one of said first and second polarities of opposite sense within a cell representing a first binary digit value and one full cycle of said second frequency corresponding to magnetization of an alternation from said first to said second polarity for first and second halves of a cell representing a second binary digit value wherein a polarity reversal occurs at a boundary between each of said successive cells;

b. clock generating means connected to said sensing means for receiving said differentiated signal and being responsive to said differentiated signal to generate first, second, and third clock signals, said first clock signals occuring at times corresponding to a one-fourth position and a three-fourths position of each of said cells, and said second and third clock signals occurring at times corresponding to a position within a second quarter position and within a fourth quarter position of each of said cells, respectively;

c. detection means connected to said clock generating means and said sensing means for receiving said first clock signals and said differentiated signal and being responsive to said first clock signals and said differentiated signal to generate a first sample signal for each cell of said succession of cells indicative of one of said first and second polarities corresponding to the magnetization of said record medium at a position within a first half of said cell and a second sample signal for each cell of said succession of cells indicative of one of said first and second polarities corresponding to the magnetization of said record medium at a position within a second half of said cell;

d. storage means connected to said detection means for receiving said first and second sample signals and being responsive to said first and second sample signals of a corresponding cell and a next first sample signal of an immediately succeeding cell for storing indications representing the sense of the polarities of said first and second sample signals of a corresponding cell and said next first sample signal of an immediately succeeding cell; and e. comparison means connected to said clock generating means and said storage means for receiving said second and third clock signals and said indications representing the sense of the polarities of said first and second sample signals and said next first sample signals and being responsive to said second clock signal and said indications representing the sense of the polarities of first and second sample signals of said corresponding cell indicative of like polarity sense to generate a first output signal indicative of a first binary digit value, being responsive to said second clock signal and stored indications representing the sense of the polarities of the first and second sample signals of said corresponding cell indicative of unlike sense of polarity to generate a second output signal indicative of a second binary digit value, and being responsive to said third clock signal and said stored indications representing the sense of polarities of said second sample signal and said next first sample signal indicative of like sense of polarity to generate an error signal.

2. A magnetic reproducing system comprising:

a. sensing means for deriving an alternating electrical differentiated signal having alternating polarity corresponding to the magnetization of a record medium having binary information stored within successive cells thereon, and alternation from a first to a second polarity for first and second halves of a cell representing a first binary digit and an alternation from said second to said first polarity for first and second halves of a cell representing a second binary digit wherein a polarity reversal occurs at a center of each of said cells;

b. clock generating means connected to said sensing means for receiving said differentiated signal and being responsive to said differentiated signal to generate first, and second clock signals, said first clock signals occurring at times corresponding to a one-fourth position and a three-fourths position of each of said cells and said second clock signals occurring at times corresponding to a position within a fourth quarter position of each of said cells, respectively;

c. detection means connected to said sensing means and said clock generating means for receiving said first clock signals and said differentiated signal and being responsive to said first clock signal and said differentiated signal to generate a first and a second sample signal indicative of a polarity corresponding to the polarity of said differentiated signal at a position within a first half and a second half of each of said cells, respectively;

d. storage means connected to said detection means for receiving said first and second sample signals and being responsive to said first and second sample signals to store indications of the polarity of each of said first and second sample signals; and e. comparison means connected to said clock generating means and said storage means for receiving said second clock signal and said first and second sample signals and being responsive to said second clock signal and stored indications of said first and second polarities indicated by said first and second sample signals respectively to generate an output signal indicative of a first binary digit, being responsive to said second clock signal and stored indications of said second and first polarities indicated by said first and second sample signals respectively to generate a second output signal indicative of a second binary digit, and being responsive to said second clock signal and said stored indications of like polarity indicated by said first and second sample signals to generate an error signal.

* * * * *